United States Patent
Garcia Garces et al.

(10) Patent No.: US 11,571,855 B2
(45) Date of Patent: Feb. 7, 2023

(54) BUILD MATERIAL MANAGEMENT

(71) Applicant: HEWLETT-PACKARD DEVELOPMENT COMPANY, L.P., Spring, TX (US)

(72) Inventors: Pedro Garcia Garces, Sant Cugat del Valles (ES); Miguel Vega Velasco, Sant Cugat del Valles (ES); Alejandro Torres Pinero, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/607,789

(22) PCT Filed: Jun. 12, 2018

(86) PCT No.: PCT/US2018/037074
§ 371 (c)(1),
(2) Date: Oct. 24, 2019

(87) PCT Pub. No.: WO2019/240773
PCT Pub. Date: Dec. 19, 2019

(65) Prior Publication Data
US 2021/0354388 A1 Nov. 18, 2021

(51) Int. Cl.
*B29C 64/336* (2017.01)
*B33Y 10/00* (2015.01)
*B33Y 30/00* (2015.01)
*B33Y 50/02* (2015.01)
*B29C 64/393* (2017.01)

(52) U.S. Cl.
CPC .......... *B29C 64/336* (2017.08); *B29C 64/393* (2017.08); *B33Y 10/00* (2014.12); *B33Y 30/00* (2014.12); *B33Y 50/02* (2014.12); *B29K 2995/0021* (2013.01)

(58) Field of Classification Search
CPC ..... B29C 64/336; B29C 64/393; B33Y 10/00; B33Y 30/00; B33Y 50/02; B29K 2995/0021
See application file for complete search history.

(56) References Cited

U.S. PATENT DOCUMENTS

| | | |
|---|---|---|
| 7,887,316 B2 | 2/2011 | Cox |
| 2010/0140852 A1* | 6/2010 | Kritchman ............. B29C 35/08 264/494 |
| 2010/0192806 A1 | 8/2010 | Heugel et al. |

(Continued)

FOREIGN PATENT DOCUMENTS

| | | |
|---|---|---|
| WO | WO2004044816 A1 | 5/2004 |
| WO | WO2014015994 A1 | 1/2014 |

(Continued)

*Primary Examiner* — Yung-Sheng M Tsui
(74) *Attorney, Agent, or Firm* — Shook, Hardy & Bacon L.L.P.

(57) ABSTRACT

Certain examples relate to a build material management system to transport build material from a collection to source to one of a plurality of storage tanks. The storage tank is determined by a controller that compares color of the build material measured by a color sensor with predetermined values. The controller routes the build material to the storage tank.

20 Claims, 5 Drawing Sheets

(56) References Cited

U.S. PATENT DOCUMENTS

| | | |
|---|---|---|
| 2014/0250835 A1 | 9/2014 | Prabhu et al. |
| 2018/0021855 A1 | 1/2018 | De Lajudie et al. |
| 2021/0162509 A1* | 6/2021 | Ferrar .................... B33Y 30/00 |

FOREIGN PATENT DOCUMENTS

| | | |
|---|---|---|
| WO | WO2017194118 A1 | 11/2017 |
| WO | WO2017194119 A1 | 11/2017 |
| WO | WO2017196355 A1 | 11/2017 |
| WO | WO2018022046 A1 | 2/2018 |

\* cited by examiner

BUILD MATERIAL MANAGEMENT

BACKGROUND

Additive manufacturing processes can produce three-dimensional (3D) objects by solidifying and unifying successive layers of build material in cross-sectional patterns of the 3D objects according to computer models. Successive layers can be solidified and unified using processes such as melting, fusing, sintering, binding, or combinations of these processes. These processes may be caused by the application of energy to build material. The application of an energy absorbing fusing agent may be used to cause only portions of build material on which the fusing agent is applied to heat up and melt when energy is applied to the layer of build material. In other systems, a laser may be used to directly melt portions of build material such as in selective laser sintering systems. Binding involves the use of chemical binding agents that bind build material particles together. Binding agents may be UV or thermally cured to harden the bound build material. Structural and decorative properties of 3D objects built in additive manufacturing processes may be controllable and may depend on the process and materials used.

BRIEF DESCRIPTION OF THE DRAWINGS

Various features of the present disclosure will be apparent from the detailed description which follows, taken in conjunction with the accompanying drawings, which together illustrate features of the present disclosure, and wherein:

FIG. 1b is a schematic diagram of a color sensor disposed on a hose of a build material management system according to the example of FIG. 1a;

DETAILED DESCRIPTION

Additive manufacturing systems may generate 3D objects in a multitude of ways. One such way, using powdered build material, is to deposit successive layers of powdered build material and to solidify a portion of the layers. This process may also be referred to as printing 3D objects. The portion of each layer which is solidified corresponds to a cross section of the object to be generated, such that as each successive layer is solidified and unified with the previous layer the sum of all the cross sections generates the object. Powdered build material may be solidified by the application of energy, such as electromagnetic radiation. Energy may be applied in a focused manner to the portion of the build material which is to be solidified. In some examples, agents may be deposited onto the build material to facilitate the solidification of the portion of build material. Some agents are deposited to the portion of build material to be solidified and then energy may be applied evenly across the layer of build material such that the portions of build material on which agents have been deposited may solidify while other portions remain un-solidified. Throughout this disclosure agents which are used in this way will be referred to as fusing, or coalescing agents. Some agents may absorb the energy applied to the build material to heat the portions of build material to the point of sintering or fully melting.

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc.

In other examples of additive manufacturing systems, the agents deposited to powdered build material may be chemical binding agents. In these cases, the chemical binding agents cause the portions of powdered build material on which they are deposited to solidify. Energy may be applied to the build material after this solidification to further harden the solidified material. In some examples, other agents may also be applied to powdered build material to modify the solidification or other properties of the material. For example, some agents, for example detailing agents, may be applied to reduce the strength of the solidification caused by fusing agents and the applied energy. This may allow some parts of the objects which are generated to be, for example, more flexible than other parts. Other agents may be used to modify the color, transparency, conductivity, or any other material property of the objects. According to one example, a suitable detailing agent may be a formulation commercially known as V1Q61A "HP detailing agent" available from HP Inc.

Powdered build material may be used to refer to wet or dry powder or powder like materials, particulate materials, and granular materials. Powdered build material may be made from many suitable materials, for example, powdered metallic materials, powdered composite materials, powdered ceramic materials, powdered resin materials, powdered glass materials, powdered polymer materials and the like. According to one example, a suitable material may be a PA12 build material commercially known as V1R10A "HP PA12" available from HP Inc.

In some examples, powdered build material may be formed from, or may comprise, short fibers that may, for example, have been cut into short lengths from long strands or threads of material. Short fibers may be metallic fibers, polymer fibers, ceramic fibers, or other suitable fiber materials.

Some additive manufacturing processes may comprise, after generating objects, recovering the objects from within the layers of un-solidified build material. In these cases, un-solidified build material may be extracted and stored for use again in another additive manufacturing process. Some of the powdered build material may be recycled multiple times. In processes where energy may be evenly applied to each successive layer of build material, un-solidified material may be heated in excess of 150° C., and in some processes in excess of 180° C. For example, PA12 may be heated in excess of 180° C. The temperature to which build material may be heated may depend on the type of build material being used. For example, powdered metallic materials may be heated to greater temperatures than powdered polymer materials. The heating and cooling of un-fused build material may affect the chemical structure of the build material. In processes where build material is recycled, repeated heating and cooling of build material can begin to alter the chemical structure of the build material such that it may become less effective for use in an additive manufacturing system. For example, objects built using build material which has been heated and cooled repeatedly may lack the structural integrity of objects which are built using fresh or un-recycled build material. The higher the temperature which build material is heated to, the faster the build material may degrade.

Some powdered build materials, as they degrade due to repeated heating and cooling processes, may change color. For example, some powdered polymer build materials, such as Vestostint® 3D Z773 PA 12 or HP 3D High Reusability PA 12, change from white to brown as they degrade. The browner the color of the powdered polymer build material, is an indication of how degraded it is. This change in color may provide an indication of the overall quality of the powdered build material. The degradation of powered build material may affect the powdered build materials ability to solidify, to be modified by agents, or the ability to be colored by the deposition of colorants.

Variables of an additive manufacturing build process may affect the degree or speed of degradation. For example, some additive manufacturing processes build objects within a volume defined by the walls of a build bin. Some users may try to maximize the number of objects which are printed in a single build process in order to reduce the time needed to print a given number of objects. To do this the additive manufacturing build process data may pack the objects within the volume very closely. Un-solidified build material between tightly packed objects may be heated to a greater temperature during an additive manufacturing process than un-solidified build material between objects which are positioned a greater distance from each other. This means that tightly packing objects in an additive manufacturing build process may increase the speed at which un-solidified build material may degrade and therefore may reduce the efficiency in terms of re-use of powdered build material.

Figure 1A:
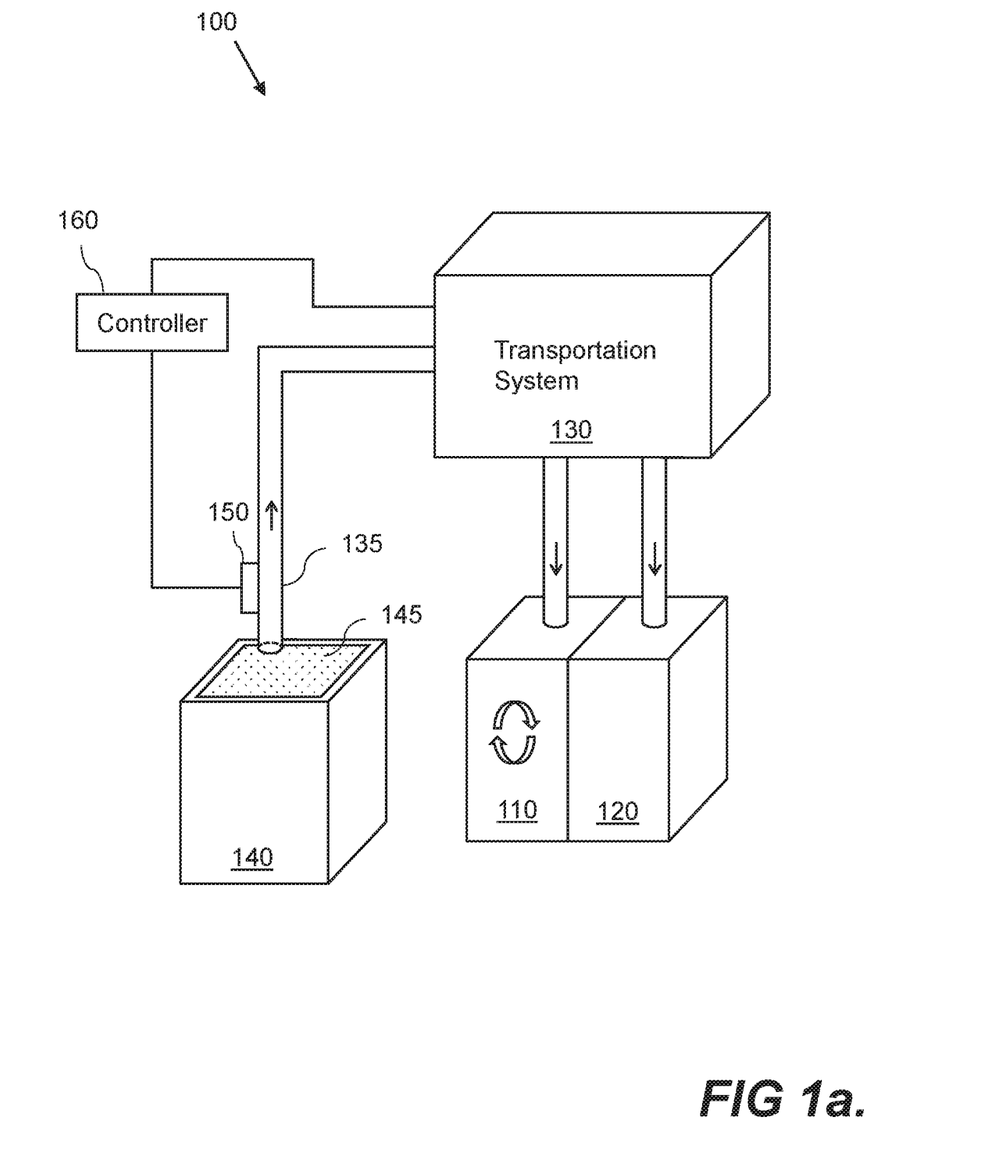
FIG. 1a is a schematic diagram of an example build material management system.
Figure 2:
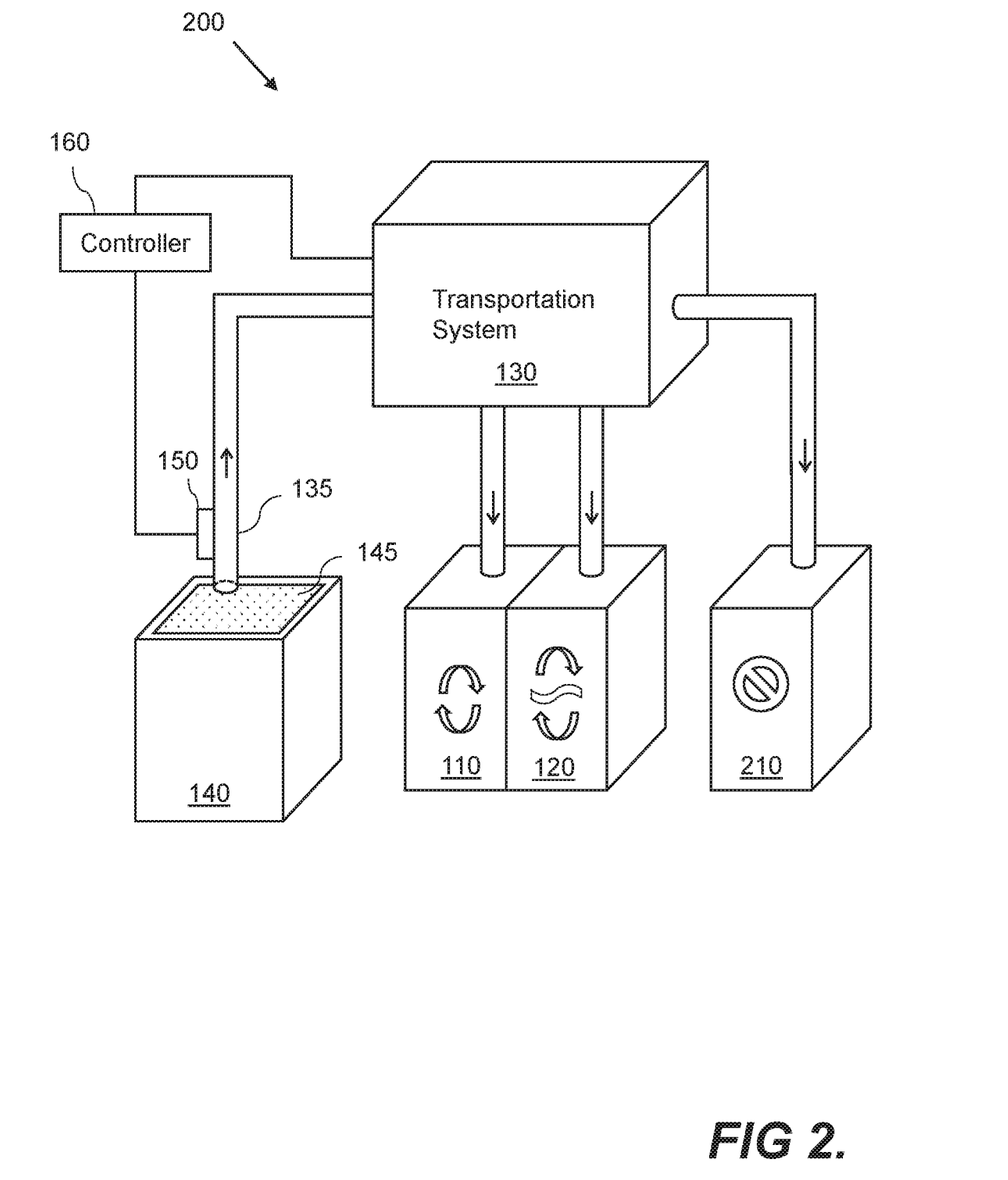
FIG. 2 is a schematic diagram of an example build material management system comprising three storage tanks.

Certain examples described herein provide a system for sorting powdered build material extracted from a collection source such as a build bin. FIGS. 1a and 2 show examples of such a system. A build material transportation system may extract powdered build material, from a collection source, through a hose. A color sensor may measure the color of the extracted powdered build material in the hose. The color of powdered build material may give an indication of the quality of the powdered build material and therefore the powdered build material may be routed to a suitable storage tank by the transportation system. The build material management system may comprise a controller to control the components in the system and to compare the color of the powdered build material with predetermined values to determine the quality of the powdered build material.

Certain examples described herein provide a non-transitory computer readable storage medium. The storage medium may comprise instructions which when executed by a processes, cause the processor to receive a signal indicative of the color of powdered build material, to compare the received signal with predetermined values, and to control the build material transportation system accordingly. In some examples the storage medium may comprise instructions to cause the processor to instruct the color sensor to measure color. The signal may comprise electrical signals, and in some cases multiple electrical signals.

Certain examples described herein provide a method of sorting powdered build material. The method may comprise extracting powdered build material, measuring the color of the extracted powdered build material and generating a signal indicative of this measurement. The signal may be compared to at least one predetermined value and based on this comparison a storage tank may be determined to store the build material. The powdered build material may be routed to the determined storage tank to complete the sorting of the powdered build material.

Returning to FIG. 1a, an example of build material management system 100 is shown. The build material management system 100 in FIG. 1a comprises a first storage tank 110 for storing powdered build material to be used in an additive manufacturing process. The first storage tank 110 may be for storing powdered build material having been used in an additive manufacturing process which is to be recycled for use in a further additive manufacturing process. In some examples, powdered build material in the storage tank 110 is processed before being used in a further additive manufacturing process. Processing of build material may comprise mixing build material with build material of a different quality. For example, powdered build material stored in tank 110 may have been used in an additive manufacturing process and may be mixed with unused powdered build material at a ratio of 4:1 respectively before being used in a further additive manufacturing process. Mixing recycled powdered build material with fresh or higher quality powdered build material may ameliorate the degradation in the quality of generated objects resulting from the use of recycled powdered build material.

The build material management system 100 may comprise a second storage tank 120. The second storage tank 120 may be used for storing powdered build material not to be used in an additive manufacturing process. The second storage tank 120 may be used for storing powdered build material which has degraded beyond a threshold and thereby, if used to generate objects, would generate objects which failed to meet a desired quality. The quality of an object may relate to the structural integrity, color, or some other parameter which may be used to quantify a generated object. In some examples, powdered build material which has degraded beyond a threshold, even if mixed with fresh powdered build material, may compromise the quality of objects which the material was used to generate. In these cases, it may be desired to dispose of this degraded powdered build material. In some examples, the second storage tank 120 may be used to store powdered build material that is to be used in an additive manufacturing process, but is of a different quality compared to the powdered build material to be stored in the first storage tank 110. For example, the powdered build material stored in tank 120 may be mixed with fresh build material in a ratio of 1:1 to make it suitable for use in an additive manufacturing process, whereas powdered build material stored in tank 110 may be mixed with fresh build material at a ratio of 1:4 respectively.

At least one of the first storage tank 110 and the second storage tank 120 may comprise electronic memory. The electronic memory may be used to store information relating to the quality of the powdered build material being stored within the respective storage tank 110, 120. Information relating to the quality of the powdered build material may comprise an indication of the reusability of the powdered build material. The electronic memory may be used to store information relating to a specified mix ratio for reuse based on the quality of powdered build material stored within the respective storage tank 110, 120. The electronic memory may be re-writable such that information can be written to the electronic memory during a process of loading powdered build material into the respective storage tank 110, 120. This may allow the electronic memory in a storage tank 110, 120 to store information relating to the powdered build material stored within the respective storage tank 110, 120 at any given time.

Storage tanks 110, 120 may comprise any number of inlets and outlets to facilitate the transfer of powdered build material into and out of the storage tanks 110, 120. The inlets and/or outlets may be connectable to pipes, hoses, or any suitable structure to allow the extraction or loading of powdered build material. Storage tanks 110, 120 may be connected to these parts by a connecting mechanism which prevent the leakage of powdered build material during transport. In some examples, the storage tanks 110, 120 are attached to the pipes or hoses at a build material trap which may use cyclonic separation to deposit powdered build material into the storage tanks 110, 120. Filtration devices such as meshes may also be used to facilitate the separation of powdered build material from a powder and air mix.

In the example shown in FIG. 1a, the build material management system 100 comprises a build material transportation system 130 for transporting powdered build material. The build material transportation system 130 may transport powdered build material from a collection source to one or other of the storage tanks 110 or 120. In an example the build material transportation system 130 may transport powdered build material using at least one pressure source, and a network of conduits. A pressure source may be a pump which generates negative pressure in the system such that powdered build material and air are drawn through the network of conduits. A conduit may be a hose, a pipe, or any other type of conduit suitable for transporting powdered build material. The direction of flow of powdered build material through the network of conduits in the transportation system 130 may be controlled using the opening and/or closing of at least one valve in the network of conduits. By opening or closing the at least one valve, powdered build material may be directed through different paths defined by the network of conduits. The opening and closing of a valve may be controlled by sending signals to an actuator or a motor at the valve. The transportation system may comprise any number of mechanical or electromechanical devices which may be used to facilitate the transportation of powdered build material including, for example motors, actuators, valves, pumps, conduits, cyclonic separation filters, mesh filters, servomechanisms, or any other suitable device.

The build material transportation system may comprise filtration systems to separate air from powdered build material. For example, the transportation system 130 may comprise filters which use cyclonic separation to deposit powdered build material into storage tanks 110, 120. The transportation system 130 may also comprise fine mesh filters to help prevent powdered build material from being delivered to a pressure source. Due to the particulate nature of the powdered build material, damage can be caused to a pressure source, such as a pump, if powdered build material were to enter the pressure source. Any number of filtration systems may be used within the transportation system 130. Other filtration systems, beyond those discussed here, may also be used. A one-way valve which allows the transport of air and powdered build material in one direction may be considered a filtration system in some examples.

In an example the build material transportation system comprises a hose 135. The hose 135 may be connected to the transportation system 130 at one end and used to extract powdered build material from a collection source at an opposing end. The collection source may comprise powdered build material having been used in an additive manufacturing process, wherein a part of the powdered build material has been solidified. The hose 135 may be a rigid or a flexible hose. In some examples, the hose 135 is a flexible tube, for example, constructed from an elastomer, and is securely attached at one end to the build material transportation system 130. With air pressure generated within the hose by at least one pressure source in the transportation system 130, the hose may be maneuvered at the opposing end to be positioned close to powdered build material such that the powdered build material is drawn through the hose into the transportation system 130 by the air pressure. In other examples, the hose 135 may be constructed from rigid parts connected with flexible joints such that the hose 135 can be moved as if the hose 135 were flexible. In other examples, the hose 135 is constructed from rigid parts and may be moved through defined paths and directions, for example, the hose 135 may be disposed on a movable carriage that can track out a predefined path to extract build material from an area of a collection source.

The end of the hose 135 which is used to collect powdered build material may comprise a filtration system. In some examples, the filtration system is a mesh structure with openings sufficiently small that parts of the powdered build material which have been solidified or solidified to generate objects cannot enter the hose or the transportation system 130. In other examples, the mesh structure may have openings which are small enough to prevent the transport of any foreign object or partially solidified parts of powdered build material which cannot be used in additive manufacturing processes.

In the example shown in FIG. 1a, the collection source is a build bin 140. The build bin 140 in this example is storing powdered build material 145 within a volume defined by the build bin 140. The powdered build material 145 stored in the build bin 140 is accessible to the hose by an open side of the build bin 140. The build bin 140 and the powdered build material 145 may have been used in an additive manufacturing process. The additive manufacturing process may comprise applying energy to powdered build material to facilitate the solidification of powdered build material in layers to generate 3D objects. As such, the powdered build material 145 within the build bin 140 may comprise 3D objects formed from solidified portions of the powdered build material 145. To extract the 3D objects from the un-solidified powdered build material the hose 135 may be used to extract the un-solidified powdered build material. In examples where the hose comprises a mesh filter at an end of the hose 135, the openings in the mesh are sufficiently small to prevent the extraction of a 3D object from the powdered build material 145.

In the example shown in FIG. 1a there is provided a color sensor 150 for measuring a color of powdered build material in the hose. The color sensor 150 is disposed on an outer side of the hose 135 of the transportation system 130 and may measure the powdered build material through an optically transmissive wall of the hose. This may prevent the color sensor from becoming damaged due to exposure to moving particulate matter such as powdered build material. The color sensor is disposed towards the end of the hose 135 which is used to extract powdered build material from the collection source. This may allow the color sensor 150 to measure the color of the build material which is being transported shortly after is has been extracted from the collection source.

Positioning the color sensor 150 towards the end of the hose 135 allows the color of the powdered build material to be determined before it is routed to a particular storage tank. The color sensor 150 may be positioned elsewhere along the hose 135 or within the transportation system 130. The color sensor 150 should be positioned along the conduit network such that it can measure the color of the powdered build material before the powdered build material is routed to one or other of the storage tanks 110, 120. This may allow build material to be sorted on the fly as it is being extracted from a collection source. This may allow more efficient sorting of build material from collection sources comprising more than one quality of build material. The color sensor will be discussed in more detail in relation to FIG. 1b.

The build material management system 100 may comprise a controller 160, for receiving a signal generated at the color sensor 150 indicative of the color of the powdered build material. The signal received by the controller 160 may depend on the type of color sensor 150 used to determine the color of the powdered build material. The signal received from the color sensor 150 may comprise frequency and voltage information indicative of the measured color.

Based on a comparison of the received signal with at least one predetermined color parameter value, the controller 160 may route the powdered build material to one or other of the storage tanks 110 or 120. The controller 160 may be implemented as any combination of program code and hardware suitable to perform the functions described herein. For example, the controller 160 may comprise a processor, or processors, to implement instructions stored on a storage medium. In the example of FIG. 1a a wired connection is shown between the color sensor 150 and the controller 160. This may allow signals generated at the color sensor 150 to be directly sent to the controller 160 for processing. In some examples, the color sensor 150 and the controller 160 communicate wirelessly and may comprise any number of wireless communication devices.

The at least one predetermined color parameter value may be determined by calibrating the build material management system 100 using powdered build material for which the quality has been determined. For example, powdered build material may be collected from multiple processes and ranked in terms of color, in the case of some polymer powders as discussed above this may be from white to brown. Samples of these may then be tested in additive manufacturing processes and the quality of the objects produced may be used to rank the quality of the different colors of build material. Chemical and physical tests may also be used directly on the powder. In some examples, the melt flow index (MFI) is measured for a range of different colors of powdered build material and the MFI value is used to rate the powdered build material. MFI is inversely proportional to the viscosity and so provides a good indicator of usability of powdered build material in additive manufacturing processes. In some examples, the first storage tank 110 may be used to store powdered build material wherein the received signal generated by measuring the color of this powdered build material falls below the at least one predetermined color parameter value. The second storage tank 120 may be used to store powdered build material wherein the received signal generated by measuring the color of this powdered build material lies above the at least one predetermined color parameter value.

Figure 1B:
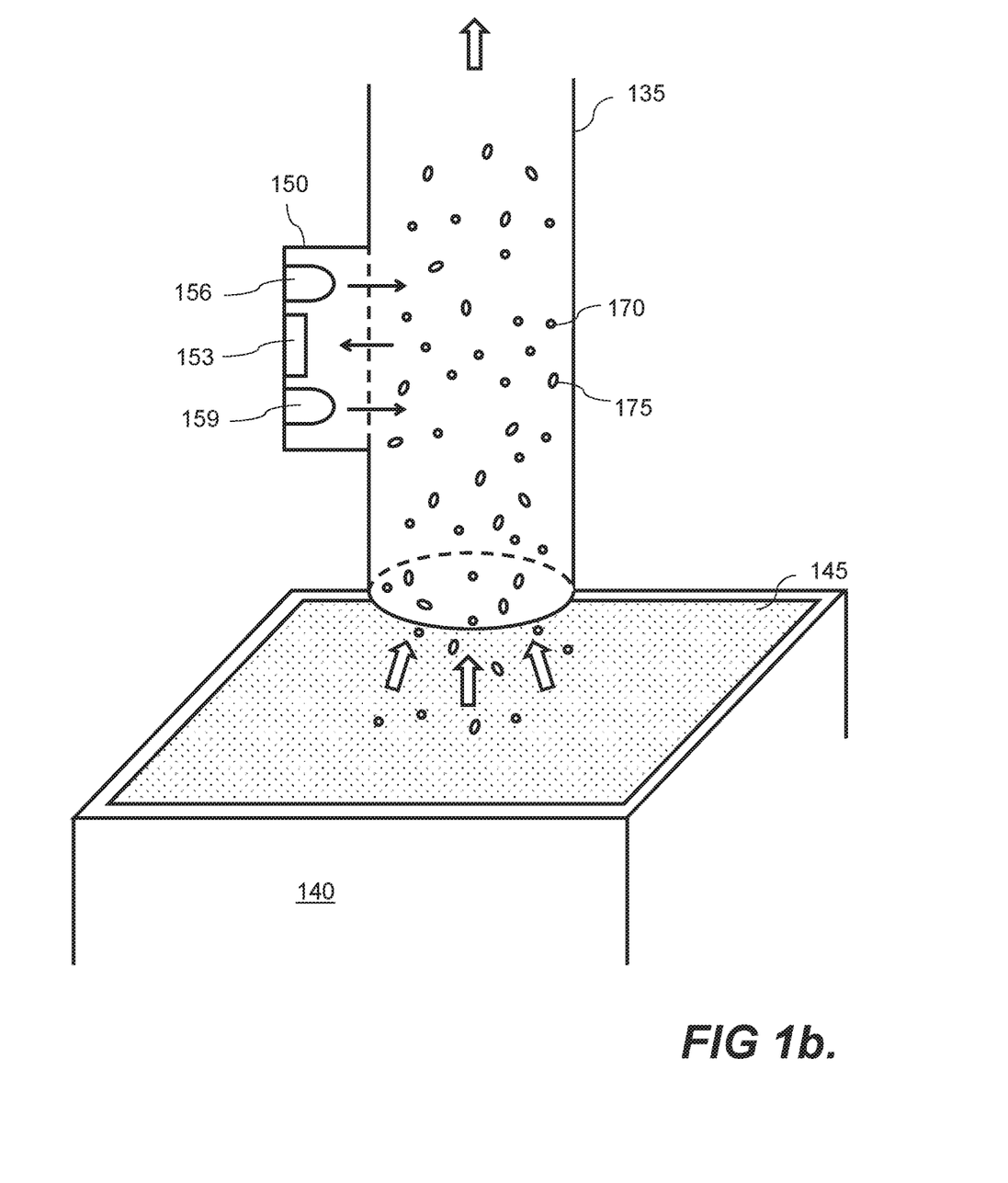

FIG. 1b shows schematically the hose 135 extracting powdered build material 145 from the collection source, shown as a build bin 140. The color sensor 150 is shown as measuring the color of the powdered build material in the hose. The color sensor 150 is disposed on an outer side of an optically transmissive part of the hose 135, shown in broken lines. In some examples, the hose 135 may comprise a filter or grate at the end closest to the collection source to prevent foreign objects, or powdered build material which has solidified beyond a size which is manageable by the build material management station 100, from being extracted. The color sensor 150 may comprise a color light-to-frequency converter 153. An example of a color light-to-frequency converter may be a TCS3200 or a TCS3210 programmable color light-to-frequency converter available from Texas Advanced Optoelectronic Solutions® (TAOS). The color light-to-frequency converter 153 may be used to detect the color of objects passing in front of the sensor. In order to measure the color, a color light-to-frequency converter 153 may be used in conjunction with at least one LED. In FIG. 1b, two LEDs are shown 156 and 159. These LEDs are positioned such that they shine light through the optically clear wall on the side of the hose 135 and powdered build material within the hose 135 will reflect a portion of the light back towards the color light-to-frequency converter 153. The color light-to-frequency converter 153 may translate the reflected light into voltage and frequency outputs. The output signals will be related to the color of the powdered build material in the hose 135 from which the light was reflected. These signals may be output to the controller 160 which may then compare the values of voltage and frequency with predetermined values to determine the quality of the build material. In some examples, the color sensor 150 operates in the visible wavelength between 400 and 700 nanometers. In other examples, the color sensor may operate beyond the visible spectrum. Other color sensors apart from color light-to-frequency converters may be used to detect the color of build material in the hose 135 for example, a charge-couple device (CCD) may be used to record digital images which may then be processed to determine the color of powdered build material. Other color sensors may use other light sources such as lasers, fiber optics, and halogen lamps.

FIG. 1b shows a sample of powdered build material traveling in the hose 135. The sample of powdered build material traveling in the hose 135 comprises a mixture of less degraded 170 and more degraded 175 powdered build material. In some examples of powdered build material, (e.g. Vestostint® 3D Z773 PA 12 or HP® 3D High Reusability PA 12) as the powdered build material degrades the molecules of the material increase in size. This may affect the viscosity of the powdered build material. During additive manufacturing processes, not all powdered build material degrades at the same rate, for example, the position within the volume and the number of times the build material has been recycled affect the speed and severity of degradation. In some examples, some of the powdered build material may have been used in more additive manufacturing processes than other parts of the powdered build material. In some examples, powdered build material used in an additive manufacturing process may be a mix of recycled and fresh powdered build material in a ratio of 4:1 respectively. Thereby, the powdered build material at the collection source may comprise some more and some less degraded powdered build material. As multiple grades of powdered build material quality may be extracted simultaneously from the collection source, the color sensor may detect an average color based on the average reflected light from the powdered build material.

In some examples, the color sensor 150 continuously measures the color of the powdered build material in the hose 135 as it is extracted from the collection source. In examples such as these, the controller 160 may continuously receive the signals from the color sensor 150 indicative of the color of the powdered build material. The controller 160 may process and compare the received signals with the predetermined color parameter such that when the quality of the powdered build material being extracted changes, for example, falls below a threshold or parameter value, the controller 160 may control the transportation system 130 to route the powdered build material to a suitable storage tank. For example, the transportation system 130 may be transporting powdered build material to the first storage tank 110. The color sensor 150 may be continuously measuring the color of powder in the hose 135. If the quality of the powdered build material being extracted changes and falls below a certain value, which will be related to the color of the material, the controller may detect this and may send a signal to the transportation system 130 to actuate at least one valve such that the powdered build material is routed to the second storage tank 120.

In other examples, the color sensor 150 may measure the color of the powdered build material at regular intervals. The intervals may be determined in any number of ways. For example, the intervals may be determined as regular periods of time following the start of an extraction process. The intervals may be determined by the volume of powdered build material which has been extracted from a collection source since the start of an extraction process. The intervals may be determined by the percentage of the total amount of build material which is to be extracted that has been extracted.

As the powdered build material transported by the transportation system 130 is particulate, consideration may be given to the flow of the powdered build material passing the color sensor 150 such that there is sufficient material passing the color sensor 150 for accurate and reliable measurements of color to be made. Flow may relate to the density and speed at which powdered build material is passed through the transportation system 130. The accuracy of color measurements may be increased by providing an absorbent, non-reflective coating to the inside of the transportation system 130 particularly at the part of the transportation system 130 where the color sensor 150 is positioned. In examples where the color sensor 150 measures reflected light, the inside of the hose may be coated in a non-reflective paint such that a majority of the reflected light measured by the color sensor 150 is reflected from the powdered build material. In some examples, the hose may comprise a non-reflective material. In examples using different color sensors or different color sensing techniques, different methods may be used to ensure accurate measurement of the powdered build material. For example, color measurements may be made by analyzing transmission of light rather than reflection.

FIG. 2 shows schematically a build material management system 200 according to an example. The build material management system shown in FIG. 2 is similar to the build material management system 100 but comprises a third storage tank to store powdered build material. In the example shown in FIG. 2, the third storage tank 210 is used for storing powdered build material which is not to be used in additive manufacturing process, for example, powdered build material which if used, even when mixed with fresh material, would result in either extremely low quality objects or would not solidify correctly during the additive manufacturing process. In this example, the second storage tank may store powdered build material to be used in an additive manufacturing process, after being processed or for parts/objects for which part quality is a low consideration. For example, prototype designs may be generated without consideration of their mechanical integrity. Processing of powdered build material may be the mixing of the powdered build material with other powdered build materials. Processing may comprise chemical or physical processes which alter the usability of powdered build material in an additive manufacturing process. Although the example of FIG. 2 shows the third storage tank 210 as the tank for storing powdered build material not be used in an additive manufacturing process or to be disposed of, any of the tanks may store such powdered build material. In some examples, at least one of the second or third storage tanks is for storing powdered build material not to be used in an additive manufacturing process. In some examples the storage tank that is for storing powdered build material for disposal may be external to the rest of the build material management system 200. This may allow the tank to be easily emptied. As the contents of this tank will not be reloaded for use in an additive manufacturing process, the tank may be emptied manually.

In some examples, at least one of the storage tanks 110, 120, 210 comprises electronic memory for storing an indication of the quality of the powdered build material stored within the at least one storage tank 110, 120, 210. When managing build material, the quality of powdered build material stored in each tank may change. For example, the minimum level of quality, for powder which is to be used in an additive manufacturing process, may decrease allowing powder which would have previously been discarded to be stored for recycling. By storing an indication of the quality of powdered build material stored within a storage tank it may be possible to keep track of the quality of powdered build material in the system and therefore use the powdered build material for appropriate additive manufacturing processes. This may increase the efficiency of the reuse of powdered build material.

In some examples, the build material management system 100, 200 may comprise a user interface to display an indication of powder quality to a user. A user interface may comprise any device which is capable of displaying information to, and in some examples receiving information from, a user. For example, a touch screen, an LED light, user operable buttons, or any other suitable device or equipment or combination thereof.

Figure 3:
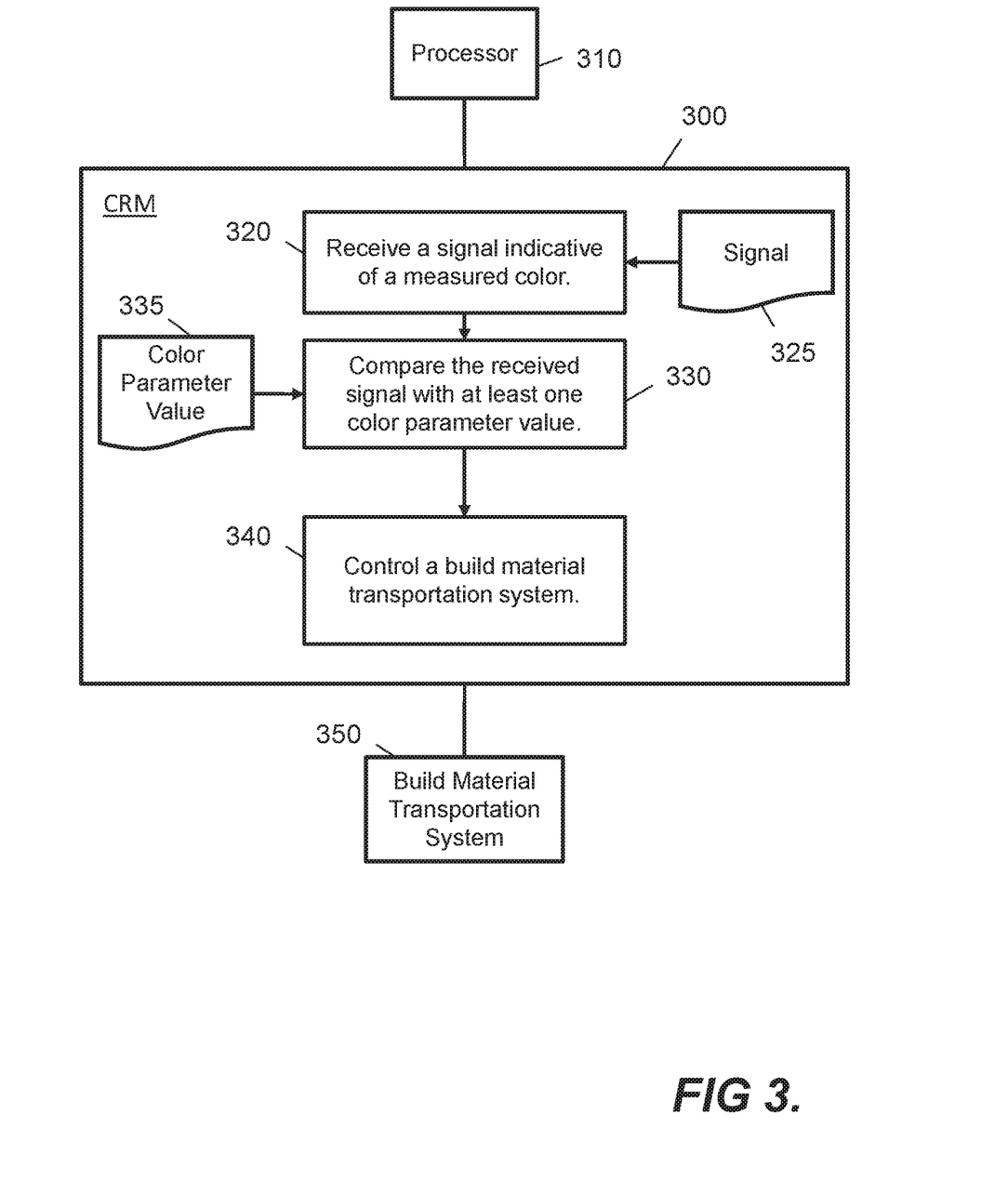
FIG. 3 is a schematic diagram of a non-transitory computer readable storage medium according to an example.

FIG. 3 shows schematically an example of a non-transitory computer readable storage medium 300 storing instructions. The instructions, when executed by a processor 310, cause the processor 310 to perform the operations described below. A first set of instructions 320 may cause the processor 310 to receive a signal 325 indicative of a measured color of powdered build material. The signal indicative of a measured color may comprise more than one electrical signal for example, signals comprising frequency and voltage information relating to a measured color. The signal 325 may be generated at a color sensor discussed above in relation to examples. The signal 325 may be dependent on the color sensor that was used to generate it. Receiving the signal 325 may comprise some processing of the signal 325. For example, passing the signal 325 through any number of analogue or digital electronic components such as amplifiers or filters to modify the signal 325.

A second set of instructions 330 may cause the processor 310 to compare the received signal 325 with at least one predetermined color parameter value 335. To compare the at least one predetermined color parameter value 335 with the received signal the processor may modify or process the signal 325 for example, to extract a value in the same format as the at least one predetermined color parameter value 335. Based on the comparison of the received signal 325 with at least one predetermined color parameter value 335, a third set of instructions 340 may cause the processor 310 to control a build material transportation system 350 to route the powdered build material to at least one of a plurality of storage tanks.

Controlling a build material transportation system 350 may comprise sending signals to the build material transportation system. A build material transportation system 350 may transport powdered build material from a collection source to at least one storage tank. The build material transportation system 350 may selectively transport powdered build material to one storage tank at a time, such that the storage tank which the build material transportation system 350 is transporting material to is selectable by the operation of at least, one valve. In an example, controlling the transportation system comprise actuating at least one valve of the build material transportation system. The transportation system may comprise a control system for regulating and monitoring the transport of build material. The build material transportation system 350 may comprise any number of valves, motors, pumps, servomechanisms and other actuators to allow the transportation system 350 to controllably transport material from a collection source to a storage tank. Signals may be sent to devices in the transportation system which cause the transportation system 350 to transport build material to a particular storage tank. This may include specifying a flow rate for the powdered build material.

In some examples, the storage medium 300 comprises instructions that may cause the processor 310 to begin a sorting process to transport powdered build material from a collection source to at least one of the plurality of storage tanks. Beginning a sorting process may comprise sending signals to the build material transportation system 350 to cause the transportation system to operate devices such as pumps and valves to cause negative air pressure in a hose which may extract powdered build material from a collection source.

The storage medium 300 may store instructions that, when executed by the processor 310, cause the processor 310 to instruct a color sensor to perform a measurement of color. In some examples, beginning a sorting process will cause the transportation system 350 to transport build material from a collection source to a particular bin. The color sensor may then be made to measure the color of powdered build material being transported. Once the measured color is compared to predetermined color parameter values the transportation system 350 may be instructed to transport powdered build material to a different storage tank.

In an example, at least one predetermined color parameter value is determined by beginning a sorting process using powdered build material having a predetermined quality. The quality of powdered build material may be determined using other methods such as testing samples of the powdered build material in additive manufacturing processes. Chemical and physical tests may also be possible, for example, the MFI of a sample of the powdered build material may be tested to determine the quality. The color of the samples of powdered build material having a determined quality may then be measured using the color sensor. The signals generated by the color sensor may be associated with powder quality values. At least one color parameter value based on the received signals may be generated.

A more specific example of this is that, a test sample of HP® 3D High Reusability PA 12 powdered build material may be degraded such that powdered build material which is fresher than this sample, and therefore whiter in color, may be used in an additive manufacturing but any powdered build material which is as degraded or more degraded, the same color or browner, may not be used in an additive manufacturing process. This test sample may be passed through the hose of the transportation system and a measurement of its color may be made using the color sensor. The signals generated by the measurement of the test sample's color may be used to generate color parameter values. In following processes, when another sample of powdered material is to be sorted using the build management system, this other sample may be extracted through the hose and the color may be measured. The signals generated by the measurement of color may be compared with the color parameter values generated from the test sample. If the current sample appears whiter then it will be routed to a storage tank for powdered build material to be used in an additive manufacturing process. Whereas, if the measured color of the current sample is browner than the test sample, it will be routed to a storage tank for build material not to be used in an additive manufacturing process. In practice, many test samples may be measured to produce a higher precision in the determination of quality based on color values.

The determination of the color parameter values, which may be considered a calibration, discussed above, may also comprise measuring test samples under different conditions such as different powder flow rates in the transportation system, different lighting conditions, different measurement rates, or any other conditions or variables which may affect the signals from the color sensor.

Figure 4:
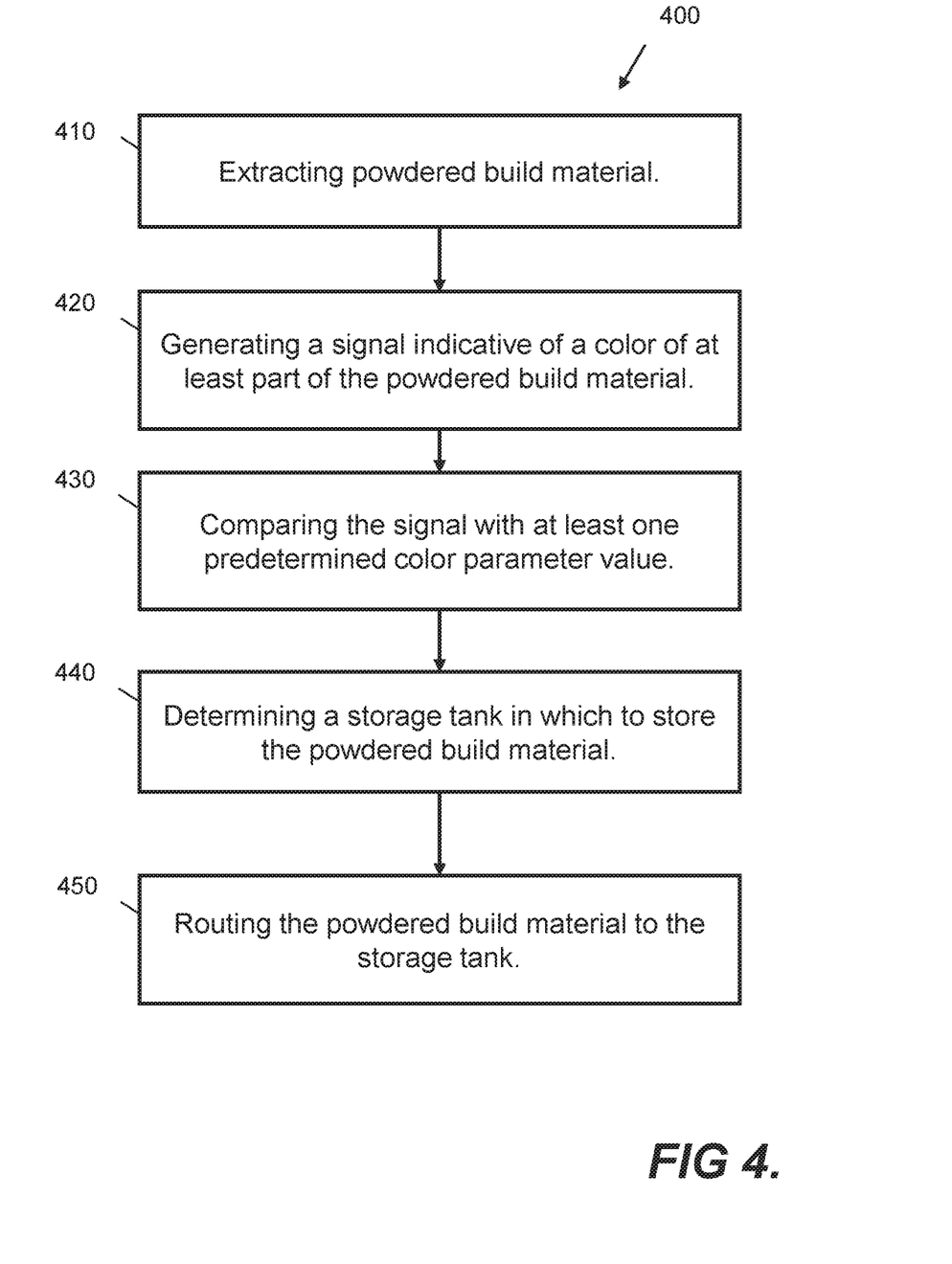
FIG. 4 is a flow chart of a method according to an example.

FIG. 4 shows a flow chart of an example method 400 of sorting powdered build material. At block 410 the method 400 comprises extracting powdered build material. Powdered build material may be extracted from a collection source by a build material transportation system. As discussed above a build material transportation system may comprise hoses, pumps, valves, motors, filters, or other devices which enable the build material transportation system to transport the powdered build material. Pumps may be used to generate negative pressure within the system such that powdered build material is drawn through hoses and/or pipes towards storage tanks. A build material transportation system may comprise multiple paths for powdered build material to be transported through. The path which powdered build material takes through the transportation system may be modified by the actuation of valves, pumps, and filters. This may allow a transportation system to transport a first portion of powdered build material to a first storage tank and a second portion of powdered build material to a second storage tank.

At block 420 the method 400 comprises generating a signal indicative of a color of at least part of the powdered build material. When using a color sensor as described above and in relation to FIG. 1b, the color of every particle of powdered build material may not be measured due to the size and speed of the particles in the powdered build material being transported. In some examples, the color sensor measures the average color of a mass of the powdered build material passing the color sensor. In some examples, the color of powdered build material is measured periodically. Block 420 specifies that the signal is indicative of the color of at least part of the build material as the color may not be continuously measured and as the measured reflected light may not be reflected from all of the build material. The signal may be generated by a color sensor according to the examples described above, positioned before, along, or anywhere within the transportation such that the color sensor is able to measure a color of powdered build material and the color may be measured before the powdered build material is routed to a particular storage tank.

At block 430 the method 400 comprises, comparing the signal with at least one predetermined color parameter value. Comparing the signal with at least one predetermined color parameter value may comprise receiving the signal at a processor. The processor may then compare the received signal with at least one predetermined color parameter value. The predetermined color parameter value may be determined by a method of calibration. The method of calibration may comprise extracting powdered build material having a predetermined quality from a collection source using a build material transportation system. To ensure accurate calibration the same or a similar arrangement of build material transportation system and color sensor as will be used during sorting processes may be used during the calibration. The method of calibration may comprise generating a signal indicative of a color of at least part of the powdered build material having a predetermined quality. The signal may be generated by the same color sensor and in the same way as that used in the sorting process. The method of calibration may comprise generating at least one color parameter value associated with the signal indicative of the color of powdered build material having a predetermined quality. This may be repeated multiple times using multiple samples having a predetermined quality. When a sorting process is performed the signal indicative of the color of at least part of the powdered build material can be compared to signals generated from powdered build material having a predetermined quality and the quality of the powdered build material being sorted may be determined.

Based on the comparison of the signal with at least one predetermined color parameter value, at block 440 the method 400 comprises, determining a storage tank in which to store the powdered build material. There may be multiple storage tanks, each associated with at least one powder quality. The sensitivity of the color sensor and the number of storage tanks may determine the number of powder qualities associated with each storage tank. In an example, such as that shown in FIG. 2, there may be three powder qualities. If the powdered build material is above a first quality, then it may be of good quality and the storage tank in which it is to be stored may be the storage tank 110. If the powdered build material is below a second quality, then it may be of very poor quality and the storage tank in which it is to be stored may be the storage tank 210. If the powdered build material is between the first and second qualities, then it may be of an intermediate quality and the storage tank in which it is to be stored may be the storage tank 120.

At block 450 the method 400 may comprise routing the powdered build material to the storage tank. The storage tank may be the storage tank which it has been determined the powdered build material will be stored in. The powdered build material may be routed using the build material transportation system.

In some examples the method 400 may be repeated at predetermined intervals defined by the elapsed time from a first instance of performing the method 400. For example, where the method 400 is implemented with a build material management system, a build bin having been used in an additive manufacturing process may have a volume of powdered build material to be extracted from within by a build material management system. The build material management system may extract and sort powdered build material from the build bin. Once powdered build material has been routed to a first storage tank, the build material management system may continue to extract and transport powdered build material to the first storage tank. After a predetermined period of time has elapsed from when the method 400 was performed the method 400 may be repeated. If during the second instance of implementing the method the quality of the powdered material is sufficiently different to be routed to a second storage tank, then the build material management system may then continue transporting powdered build material to the second storage tank. As discussed above, the quality of powdered build material after having been used in an additive manufacturing process may be dependent on its position within the volume defined by the build bin. As such, powdered build material of a particular quality may be found in patches, meaning that measuring and rerouting the build material at regular intervals may be sufficient to sort the powdered build material accurately by powder quality.

In other examples, the method 400 may be repeated at predetermined intervals defined by the cumulative volume of powdered build material having been extracted since the first instance of performing the method 400. As above this may enable a build material management system to measure and reroute powdered build material sufficiently frequently to accurately sort the powdered build material. In some cases, for example, where the color sensor is poorly calibrated, or the powdered build material quality is distributed in tight patches of very different quality very close to each other, performing the method in regular intervals may prevent components such as valves in the transportation system from being operated too frequently and causing damage to the system.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A build material management system comprising at least:
   a first storage tank configured for storing powdered build material to be used in an additive manufacturing process;
   a second storage tank configured for storing powdered build material;
   a build material transportation system configured for transporting powdered build material from a collection source to one or the other of the first and second storage tanks, the build material transportation system comprising a hose and a valve;
   a color sensor configured for measuring a color of powdered build material while the powdered build material is being transported through the hose; and
   a controller connected to the color sensor, the controller configured for receiving a signal generated at the color sensor that is indicative of the color of the powdered build material that is flowing through the hose, the controller configured to operate the valve of the build material transportation system, based on a comparison of this received signal with a color parameter value, so as to route the ongoing flow of powdered build material through the hose to one or the other of the first and second storage tanks to sort the powdered build material on the fly as it is being extracted from the collection source.

2. The build material management system of claim 1, comprising a third storage tank to store powdered build material, wherein at least one of the second and third storage tanks is for storing powdered build material not to be used in an additive manufacturing process.

3. The build material management system of claim 1, wherein the collection source comprises powdered build material having been used in an additive manufacturing process wherein a part of the powdered build material has been solidified.

4. The build material management system of claim 1, wherein the color sensor is disposed on an outer side of an optically transmissive part of the hose.

5. The build material management system of claim 1, comprising a user interface to display an indication of powder quality to a user.

6. The build material management system of claim 2, wherein at least one storage tank comprises electronic memory for storing an indication of quality of the powdered build material stored within the at least one storage tank.

7. The build material management system of claim 1, wherein the controller comprises a processor and a non-transitory computer readable storage medium storing instructions that, when executed by the processor, cause the processor to:
receive the signal from the color sensor indicative of the color of the powdered build material;
compare the received signal with the color parameter value; and
based on the comparison of the received signal with the color parameter value, determine whether the build material qualifies for use in a subsequent build process and control the build material transportation system to route the powdered build material to at least one of a plurality of storage tanks based on whether the build material qualifies for use in a subsequent build process.

8. The build material management system of claim 7, wherein the storage medium is storing instructions that, when executed by the processor, cause the processor to begin a sorting process to transport powdered build material from a collection source to one of three different storage tanks depending on how suitable the build material is for use in a subsequent build process.

9. The build material management system of claim 7, wherein controlling a build material transportation system comprises actuating the valve and a pump of the build material transportation system.

10. The build material management system of claim 7, wherein the color parameter value is determined by:
beginning a sorting process using powdered build material having a predetermined quality;
receiving signals from the color sensor indicative of the color of the powdered build material having a predetermined quality; and
generating at least one color parameter value based on the received signals.

11. A method of sorting powdered build material in a build material management system comprising:
a first storage tank configured for storing powdered build material to be used in an additive manufacturing process;
a second storage tank configured for storing powdered build material;
a build material transportation system configured for transporting powdered build material from a collection source to one or the other of the first and second storage tanks, the build material transportation system comprising a hose and a valve;
a color sensor configured for measuring a color of powdered build material while the powdered build material is being transported through the hose; and
a controller connected to the color sensor, the controller configured for receiving a signal generated at the color sensor that is indicative of the color of the powdered build material that is flowing through the hose, the controller configured to operate the valve of the build material transportation system, based on a comparison of this received signal with a color parameter value, so as to route the ongoing flow of powdered build material through the hose to one or the other of the first and second storage tanks to sort the powdered build material on the fly as it is being extracted from the collection source;
the method comprising:
extracting powdered build material from the collection source by the build material transportation system;
with the sensor, generating the signal indicative of the color of at least part of the powdered build material;
with the controller, comparing the signal with at least one predetermined color parameter value;
based on the comparison of the signal with the at least one predetermined color parameter value, determining a storage tank in which to store the powdered build material; and
routing the powdered build material on the fly to the determined storage tank using the build material transportation system.

12. The method of claim 11, wherein at least one predetermined color parameter value is generated by:
extracting powdered build material having a predetermined quality from a collection source using a build material transportation system;
generating a signal indicative of a color of at least part of the powdered build material having a predetermined quality; and
generating at least one parameter value associated with the signal indicative of the color of the powdered build material having a predetermined quality.

13. The method of claim 11, further comprising sorting the build material into one of a first storage container for build material to be used in any subsequent build process and a second storage container for build material only to be used in a subsequent build process for a prototype or other build with relaxed quality specifications.

14. The method of claim 11, comprising repeating the method at predetermined intervals.

15. The build material management system of claim 4, further comprising a non-reflective material in the hose adjacent to the optically transmissive part of the hose through which the color sensor operates.

16. The build material management system of claim 1, wherein:
the first storage tank is designated to receive recycled build material to be mixed with fresh build material at a first ratio for use in a subsequent build process;

the second storage tank is designated to receive recycled build material to be mixed with fresh build material at a second ratio, higher than the first ratio, for use in a subsequent build process; and the controller is programmed to route build material to the first or second storage tank based on the measured color of the build material as indicating a quality of the build material and performance in a subsequent build process.

17. The build material management system of claim 16, further comprising a third storage tank designated to receive build material that is not to be used in a subsequent build process, the controller programmed to selectively route build material to the third storage tank based on the signal from the color sensor.

18. The build material management system of claim 1, wherein the color sensor is disposed at a collection end of the hose to allow time for the controller to selectively route the build material based on the comparison.

19. The build material management system of claim 1, wherein the controller is programmed to make the comparison based on an average color of the build material as indicated by the received signal from the color sensor over a period of time as compared to the color parameter value.

20. The build material management system of claim 1, wherein the controller is programmed to make the comparison only at periodic intervals.

* * * * *